United States Patent
Nesje

(10) Patent No.: US 8,091,861 B2
(45) Date of Patent: Jan. 10, 2012

(54) VALVE FOR USE IN CONNECTION WITH OIL PRODUCTION AND GAS PRODUCTION

(75) Inventor: Svein Nesje, Oslo (NO)

(73) Assignee: Aker Subsea AS, Lysaker (NO)

( * ) Notice: Subject to any disclaimer, the term of this patent is extended or adjusted under 35 U.S.C. 154(b) by 0 days.

(21) Appl. No.: 12/515,496

(22) PCT Filed: Nov. 14, 2007

(86) PCT No.: PCT/NO2007/000401
§ 371 (c)(1),
(2), (4) Date: Jun. 9, 2009

(87) PCT Pub. No.: WO2008/063073
PCT Pub. Date: May 29, 2008

(65) Prior Publication Data
US 2010/0243936 A1    Sep. 30, 2010

(30) Foreign Application Priority Data
Nov. 20, 2006    (NO) .................................. 20065317

(51) Int. Cl.
*F16K 3/02* (2006.01)
(52) U.S. Cl. ........................................ 251/282; 251/328
(58) Field of Classification Search .......... 251/326–329, 251/282
See application file for complete search history.

(56) References Cited

U.S. PATENT DOCUMENTS

| | | | | |
|---|---|---|---|---|
| 3,335,999 A | * | 8/1967 | Lowrey | 251/172 |
| 3,693,986 A | | 9/1972 | Lambie | |
| 4,062,516 A | * | 12/1977 | Grove | 251/174 |
| 4,364,544 A | * | 12/1982 | Kim | 251/328 |
| 4,471,943 A | | 9/1984 | Nelson | |
| 4,519,582 A | * | 5/1985 | Freeman | 251/328 |
| 4,531,710 A | * | 7/1985 | Tort O. | 251/167 |
| 4,625,942 A | * | 12/1986 | Nelson | 251/327 |
| 4,741,509 A | * | 5/1988 | Bunch et al. | 251/172 |
| 4,893,500 A | | 1/1990 | Fink-Jensen | |
| 4,911,407 A | | 3/1990 | Paul, Jr. | |
| 5,332,002 A | | 7/1994 | Reimert | |
| 5,803,431 A | * | 9/1998 | Hoang et al. | 251/327 |
| 5,836,570 A | * | 11/1998 | Blenkush et al. | 251/328 |
| 2001/0042618 A1 | | 11/2001 | Cunningham et al. | |
| 2006/0243941 A1 | * | 11/2006 | Hunter | 251/359 |

FOREIGN PATENT DOCUMENTS

| | | |
|---|---|---|
| DK | 145787 A | 9/1988 |
| EP | 0 189 526 A2 | 8/1986 |
| EP | 0 857 901 A2 | 8/1998 |
| GB | 29419 | 12/1910 |
| GB | 1 280 712 | 7/1972 |
| GB | 2 272 271 A | 5/1994 |
| GB | 2 293 433 A | 3/1996 |
| SE | 377 960 B | 8/1975 |

* cited by examiner

*Primary Examiner* — John Bastianelli
(74) *Attorney, Agent, or Firm* — Birch, Stewart, Kolasch & Birch, LLP

(57) ABSTRACT

A valve for use in connection with oil production and gas production comprising a valve housing (1) which is connected to at least one inlet (2) and an outlet (3), which together define a flow channel (16) through the valve, a valve body (9), which is set up to selectively open and close for fluid flow in the flow channel (16). A valve seat (6,7), is fitted with at least one seal against the valve housing (1), the valve seat (6) is fitted with an undercut (31) on the side of the valve seat that faces the valve body (9). The undercut (31) is in direct fluid communication with the flow channel (16).

7 Claims, 5 Drawing Sheets

VALVE FOR USE IN CONNECTION WITH OIL PRODUCTION AND GAS PRODUCTION

The present invention relates to a valve for use in connection with oil production and gas production, especially for offshore use.

Many valves are used in connection with oil production and gas production. Common to these is that they are subjected to high pressures and high temperatures, corrosive fluids and particles, and a failure in one valve can lead to serious consequences both with regard to safety of the workers in the vicinity of the valve and with regard to environmental damage. Furthermore, a failure will have great economic consequences. A part of the valves is also placed so that repairing and replacement is both difficult and costly. This is particularly the case for valves that are placed underwater, and specifically at great ocean depths.

Therefore there is a great need to design these valves so that they are as dependable as possible and last for as long as possible.

The present invention aims, in a first aspect, to provide a valve where the danger of damage and wear on seals between the valve seat and the valve housing, is reduced. This is achieved in that the valve seat is fitted with an undercut on the side of the valve seat that faces the valve body, said undercut is in direct fluid communication with a flow channel. Thereby a controlled leak between the valve seat and the valve body is obtained, so that the fluid chooses this way instead of forcing itself past the seals.

In that the undercut has an area which is influenced by the pressure from the flow channel, said area is at least as large as the area at the opposite end of the valve seat which is influenced by the pressure from the flow channel, the valve seat will be forced against the valve housing so that the sealing here is increased further.

The present invention is especially suited for a gate valve.

The valve preferably comprises two valve seats that sit on each side of the valve body. Thereby one achieves firstly, a good control of the valve body from two sides and, secondly, the valve will seal well both ways.

According to a preferred embodiment, the valve seat is fitted with a guiding ring that surrounds the valve seat at the end that faces the valve body with the guiding ring being set up to form a guide for the valve body. Thereby a safe control is achieved for the valve body between open and shut position.

The guiding ring preferably comprises protrusions that are arranged to lay abut against the valve body to stabilise this in a direction traverse to the extension of the flow channel. Thereby a four-sided support for the valve body is achieved.

According to a further preferred embodiment, the valve body has a four-sided cross section where two opposite sides lie against their respective valve seats and the two other opposite sides lie against the protrusions of the guiding ring. With such a cross section the valve body will be easy to manufacture, as one can face mill the side of the valve body with great precision.

The invention shall now be described in greater detail with reference to the enclosed figures, in which.

Figure 1:
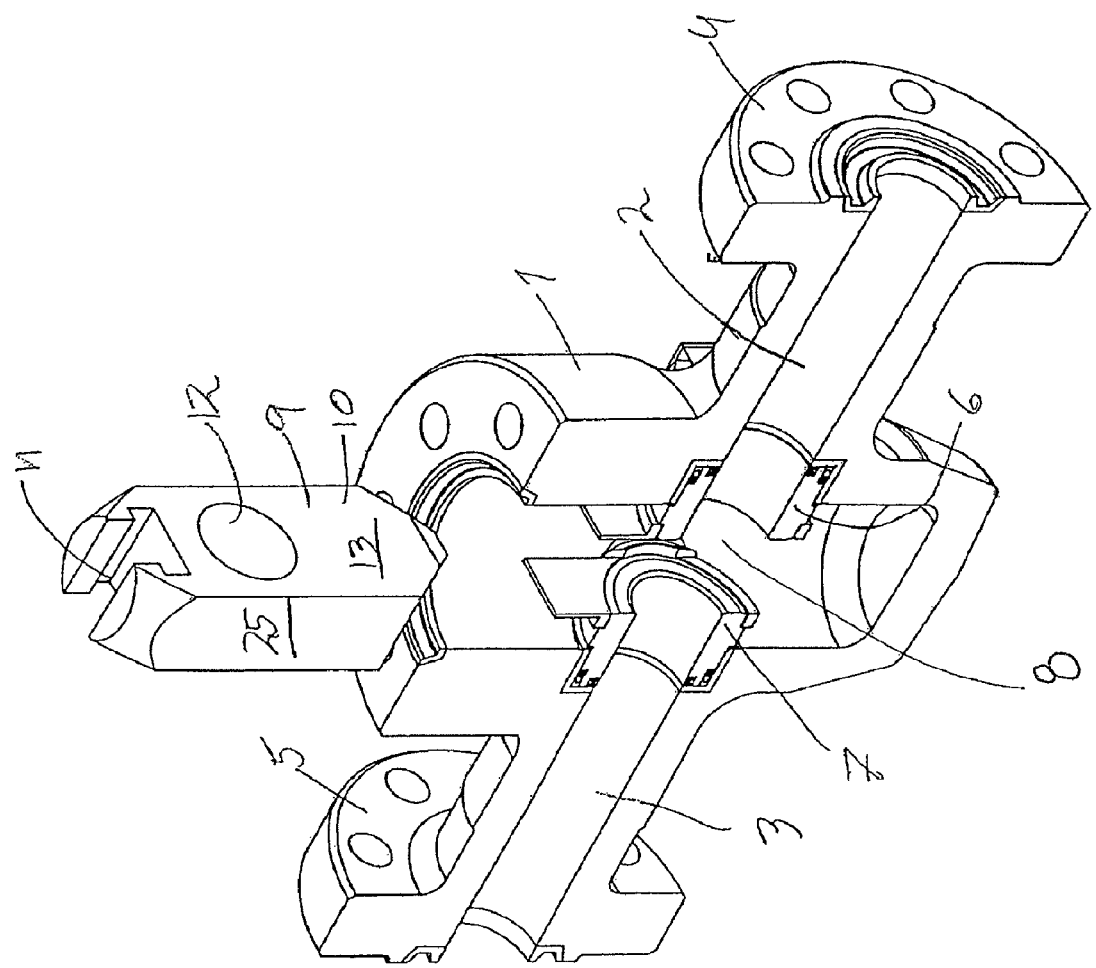
FIG. 1 shows a perspective cross sectioned drawing of a valve according to a preferred embodiment where the valve body is shown separately from the valve housing.

The valve shown in FIG. 1 comprises a valve housing 1 which is fitted with an inlet 2 and an outlet 3, which, at its outer ends, is fitted with a flange 4, 5. A first valve seat 6 and a second valve seat 7 are arranged in the valve housing and these are connected to the inlet 2 and the outlet 3, respectively, and form a gap 8 in between them. In this gap 8 there is room for a valve body 9.

The valve body 9 has a first side surface 10 and a second opposite side surface (hidden in FIG. 1), which is set up to form a seal with a respective valve seat 6, 7. Furthermore the valve body has a third side surface 25 that stands perpendicular to the first side surface 11 and the second side surface and a fourth side surface (hidden in FIG. 1), that stands opposite to the third side surface 25. The valve body 9 has, at its one end, a dovetail groove 11 for engagement with an actuator (not shown). The valve body 9 has a through opening 12 from the first side surface 10 to the second side surface. Next to the opening 12 is an area 13 of at least the same size as the opening 12.

Figure 2:
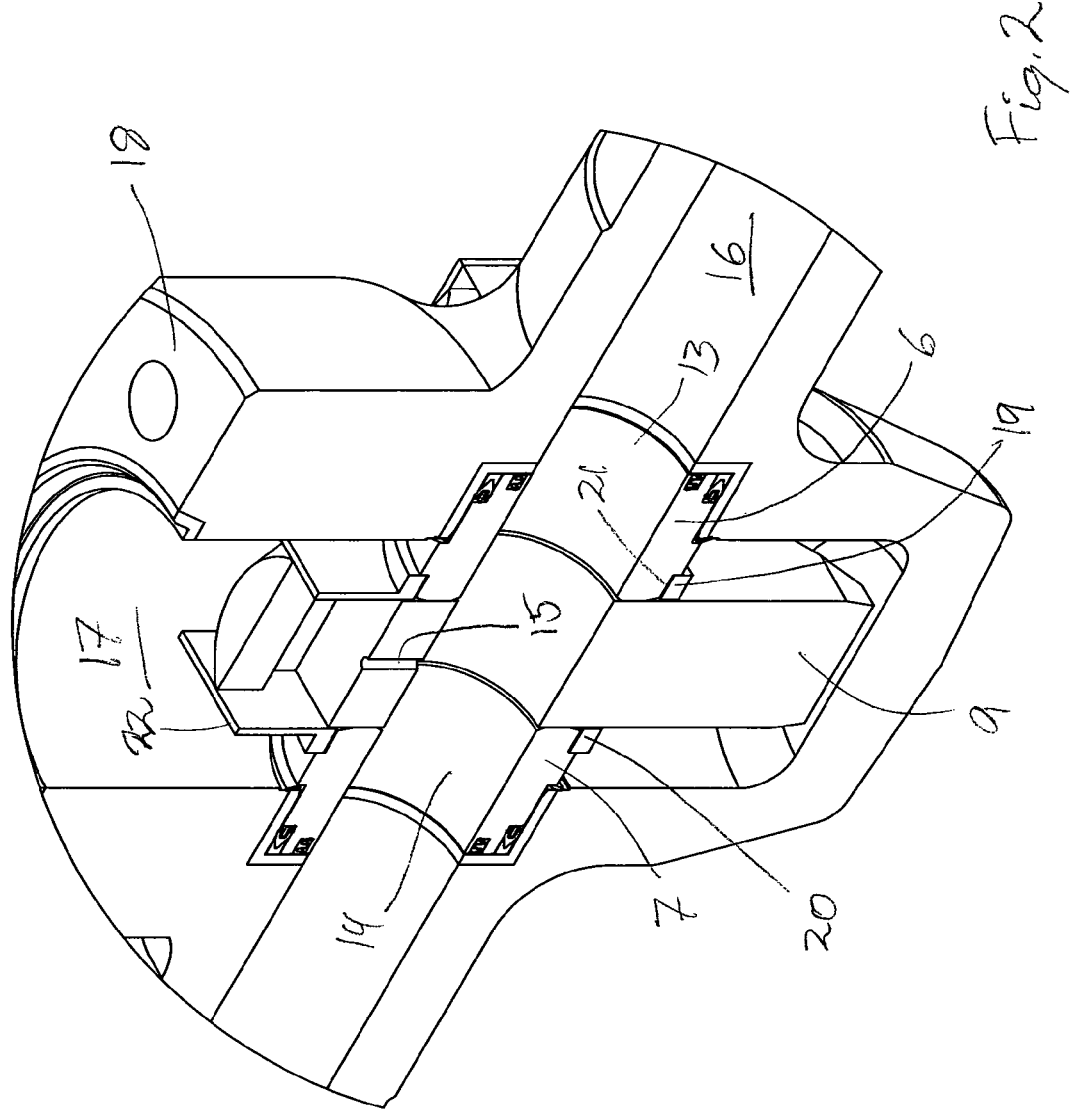
FIG. 2 shows a detail of the valve with the valve body in place in the valve housing.

FIG. 2 shows a valve housing 1 with the valve body 9 in place between the valve seats 6 and 7. The valve seats consist, in the main, of a seat casing that has a through-running bore 13, 14. In the depicted position of the valve body 9 the valve is open and the opening 12 is aligned with the through-running bores 13, 14. When the valve body 9 is in place, this forms a divide between the flow channel 16 of the valve and a cavity 17 in the valve housing. The cavity 17 is sealed off from the surroundings with the help of a lid (not shown) that is fastened to a flange 18.

The valve body 9 also has a channel 15 that extends from about the middle of the longitudinal axis of the opening 12 to the bottom of the dovetail groove 11. The channel 15 thus provides communication between the flow channel 16 of the valve and the cavity 17 for pressure equalisation between these. The channel 5 runs out on the underside of the actuator (not shown) that engages with the dovetail groove 11 so that this blocks for through flow of sand to the cavity 17.

Figure 3:
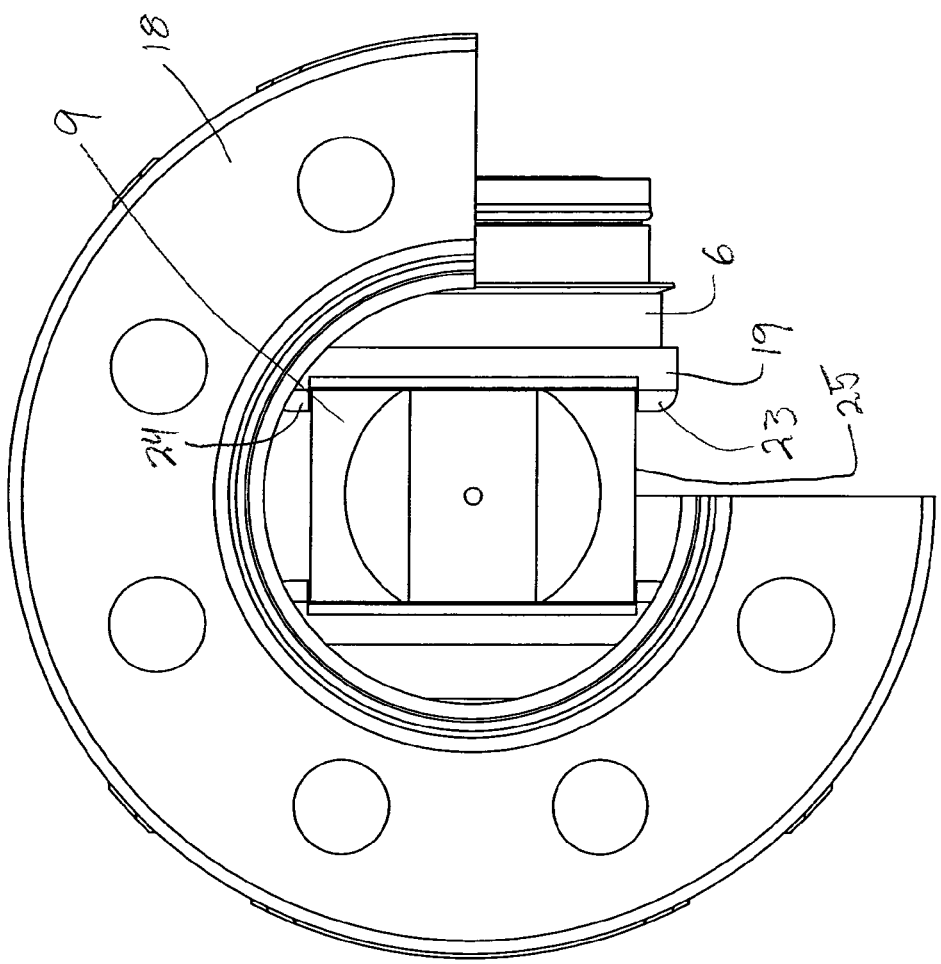
FIG. 3 shows the valve seen from above.

At the end of each valve seat 6, 7 that is closest to the valve body 9, a guiding ring 19, 20 is arranged. This ring 19, 20 sits on a shoulder 29 on the periphery of the valve seat 6, 7 and lies with a small gap in towards the valve body 9. On the one side, especially where the opening 12 of the valve body 9 is located when the valve is shut, the ring 19, 20 is fitted with a plate 22. The plate 22 prevents direct communication between the flow channel 16 and the cavity 17 when the valve body is in an intermediate position during opening and closing. FIG. 3 shows the valve viewed from above. Here one sees the flange 18 of the valve housing and the valve body 9 inside the valve housing. In the figure a quarter of the valve housing is removed so that the one seat 6 is clearly visible. Shown at the end of the valve seat 6 is the guiding ring 19. As one can see, the guiding ring has protrusions 23, 24 that extend out onto the side of the valve body 9 so that these lie against the third side surface 25 and the fourth side surface, respectively. Due to the protrusions of the guiding ring the valve body will be securely positioned between the valve seats and the movement between the open and closed position is clearly defined. Because of the supporting function of the guiding ring 19 for the valve body 9 it is possible to manufacture the valve body with a square cross section, where two opposite side surfaces face the valve seats and block for flow of fluid when the valve is closed and two opposite side surfaces face the protrusion 23, 24 of the guiding ring and ensure that the valve body is stabilised sideways. A square valve body is much simpler to manufacture than a valve body with arched or circular cross sections. The cross section is preferably rectangular with two and two different lengths so that it is not possible to fit the valve body the wrong way. The valve body is also appropriately symmetrical around two perpendicular length planes so that it can be turned 180° without malfunctioning.

Figure 4:
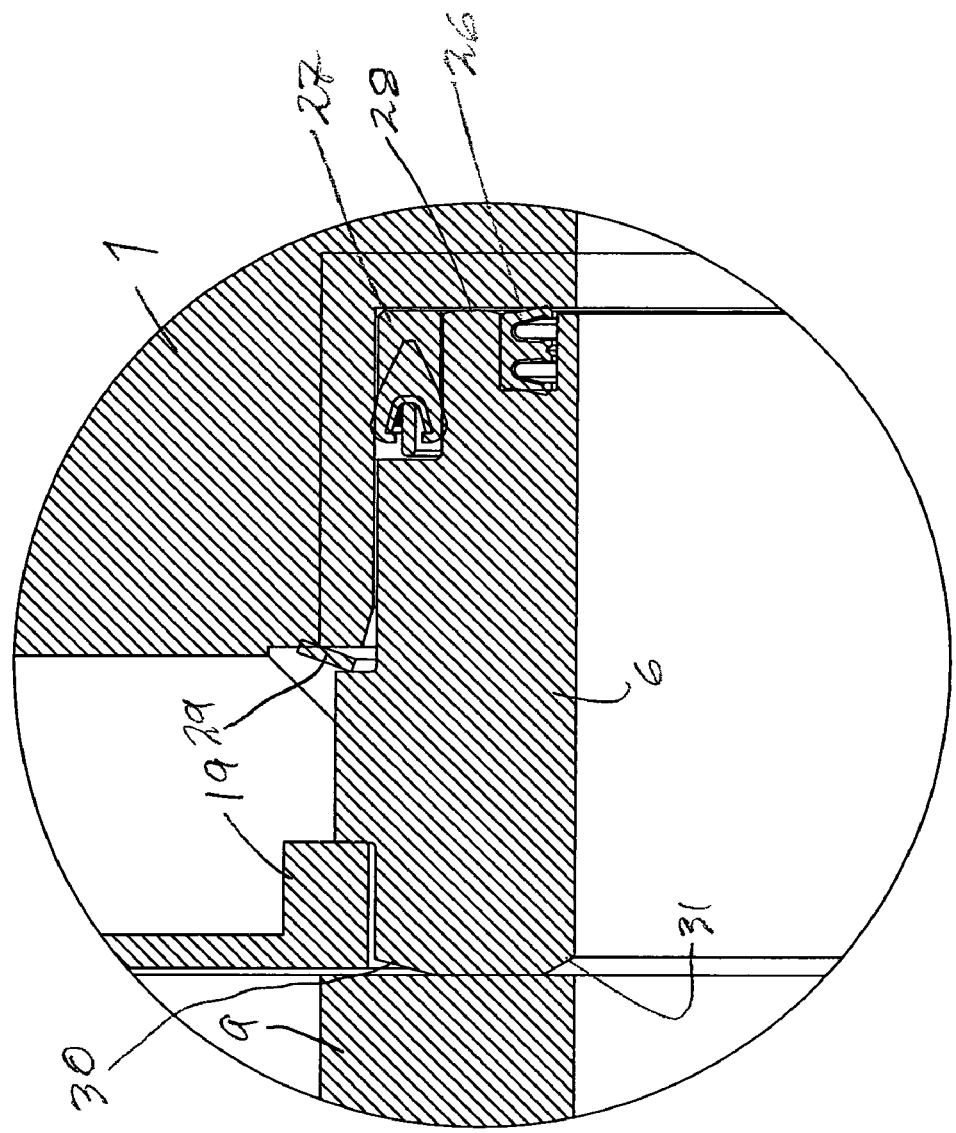
FIG. 4 shows a section of a detail of a valve seat with the valve in open position.
Figure 5:
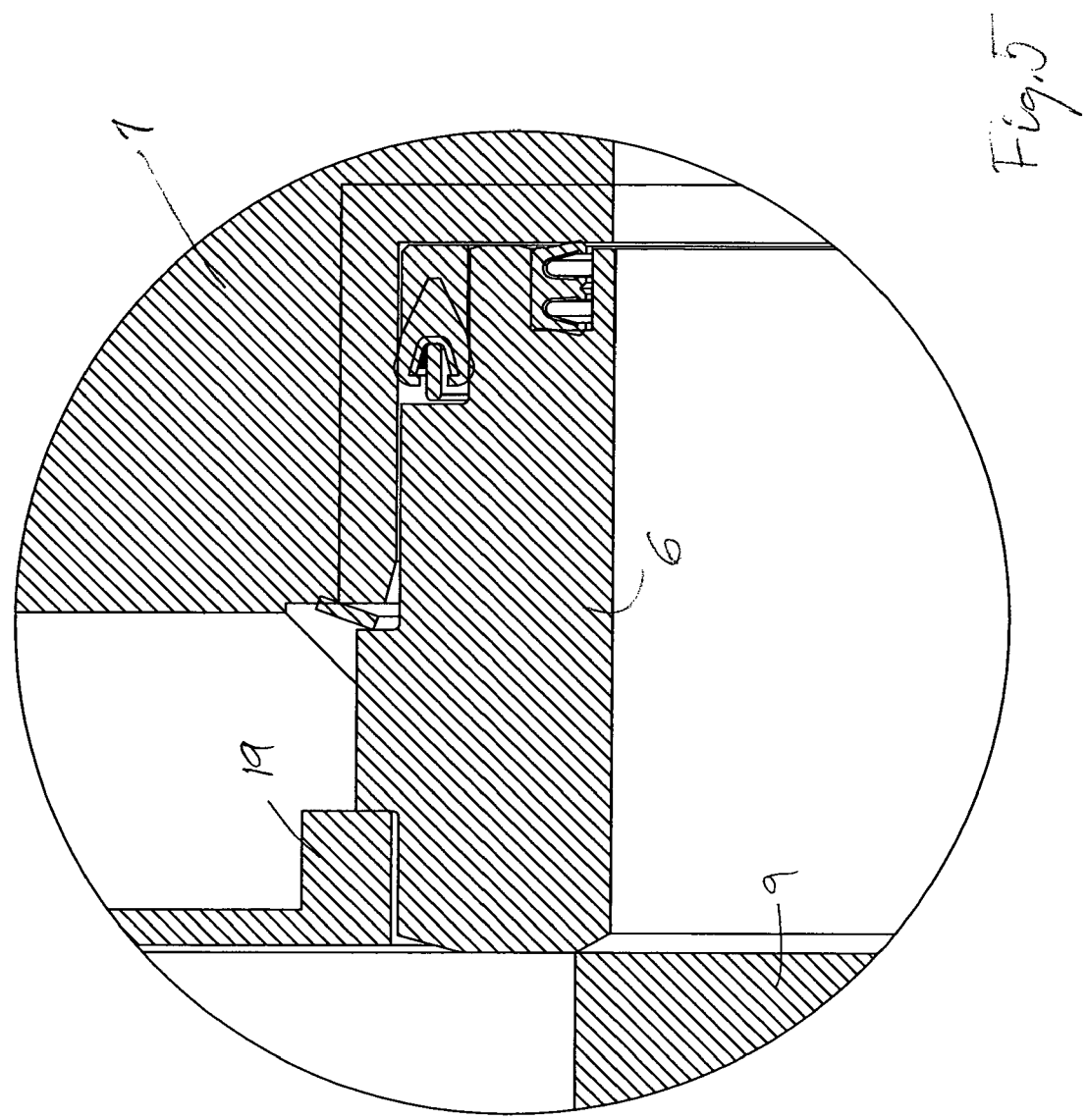
FIG. 5 shows a section corresponding to the valve in FIG. 3 but with the valve in closed position.

Reference shall now be made to the FIGS. 4 and 5 that show a section through a part of the valve seat 6, the valve body 9, the valve housing 1 and the guiding ring 19 in open and closed position, respectively.

The valve seat is fitted with grooves for two seals 26 and 27. The first seal 26 is a primary seal that prevents fluid and any particles from penetrating between the valve seat 6 and the valve housing 1. The second seal 27 prevents particles and fluid from penetrating between the end of the valve seat 6 and the valve housing 1. Between the two seals 26 and 27 there is an area 28 (that stretches as a ring at the end of the valve seat), which is set up to form a metal to metal seal between the valve seat 6 and the valve housing 1.

Also arranged is a spring disc 29 that forces the valve seat 6 against the valve body 9. The spring disc 29 also contributes to prevent the ingress of sand between the valve seat 6 and the valve body 1.

At the end of the valve seat 6 that faces the valve body 9 two undercuts are arranged, one outer undercut 30 and an inner undercut 31. An outer undercut 30 has previously been much used to release any overpressure in the cavity 1 outside the valve body 9 into the flow channel.

However the function of the inner undercut 31 is to ensure that any overpressure which would exist in the flow channel 16 in relation to the cavity 17 during closure of the valve and after the valve is closed is let out to the cavity without having to go via the seals 26, 27 and 28. For conventional valves without the inner undercut 31 some fluid (and thus also some particles) will always enter in between the valve housing and the valve seat, however good the seal between the valve seat and the valve housing would be. Over time this will damage the seal between the valve housing and valve seat.

The undercut 31 ought to be somewhat larger than, or at least as great as, the distance between the flow channel 16 and the first seal 26. Thereby the pressure in the flow channel 16 will work on a larger surface on the side of the valve seat 6 that faces the valve body than on the side of the valve body 6 that faces the valve housing 1 (and where the seals 26-28 also are), so that the valve seat 6 is pressed against the valve housing 1 and the sealing effect at the seals 26-28 increases.

This means that some fluid and possibly some particles will leak between the valve seat 6 and the valve body 9, as these are slightly forced apart. However, this small leakage is of very little significance. In the interface between the valve seat and the valve body there are no seals that can be damaged by particles.

There will be a greater need to form an undercut on the upstream valve seat, but for it to be unnecessary to have two different valve seats and to make it equally functional to drive the fluid stream both ways in the valve, it is appropriate that both the valve seats are formed with such an undercut. When the valve is closed there can also be a residual pressure on the downstream side of the valve body, said residual pressure can force particles in behind the first seal 26. An undercut on the downstream valve body will effectively prevent this.

The invention claimed is:

1. A valve for use in connection with oil and gas production comprising:
   a valve housing connected to at least one inlet and an outlet, the at least one inlet and the outlet together define a flow channel through the valve;
   a valve body arranged to selectively open and close for fluid flow in said flow channel; and
   at least one valve seat, said valve seat being provided with at least one seal against the valve housing,
   wherein the valve seat is provided with an undercut on that side of the valve seat that faces the valve body, said undercut is in direct fluid communication with the flow channel, and the undercut has an area which is influenced by the pressure from the flow channel, and said area is at least as large as an area at an opposite end of the valve seat which is influenced by the pressure from the flow channel, said area being defined by a distance between the flow channel and the at least one seal and the circumference of the flow channel, and
   wherein the valve seat is provided with a guiding ring surrounding the valve seat and leaning against the valve housing at the end thereof facing the valve body, said guiding ring being arranged to form a guide for the valve body and comprising protrusions which are arranged to abut against the valve body to stabilise the valve body in a direction traverse to the extension of the flow channel.

2. A valve according to claim 1, wherein the valve is a gate valve.

3. A valve according to claim 1, wherein the valve comprises two valve seats that are located on separate sides of the valve body.

4. A valve according to claim 1, wherein the valve body has a rectangular cross section, wherein two opposite sides of the valve body engage a respective valve seat and the two other opposite sides engage the protrusions of the guiding ring.

5. A valve according to claim 2, wherein the valve comprises two valve seats that are located on separate sides of the valve body.

6. A valve according to claim 2, wherein the valve seat is provided with a guiding ring that surrounds the valve seat and leans against the valve housing at the end thereof facing the valve body, said guiding ring being arranged to form a guide for the valve body.

7. A valve according to claim 3, wherein the valve seat is provided with a guiding ring that surrounds the valve seat and leans against the valve housing at the end thereof facing the valve body, said guiding ring being arranged to form a guide for the valve body.

* * * * *